July 8, 1958     G. W. MOSSOR     2,842,032
SLEEVING APPARATUS FOR VALVED PAPER BAGS
Original Filed June 26, 1952     9 Sheets-Sheet 2

INVENTOR.
GEORGE W. MOSSOR.
BY
ATTORNEYS.

July 8, 1958 G. W. MOSSOR 2,842,032
SLEEVING APPARATUS FOR VALVED PAPER BAGS
Original Filed June 26, 1952 9 Sheets-Sheet 3
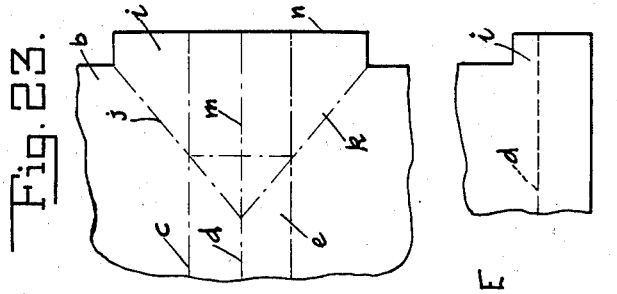
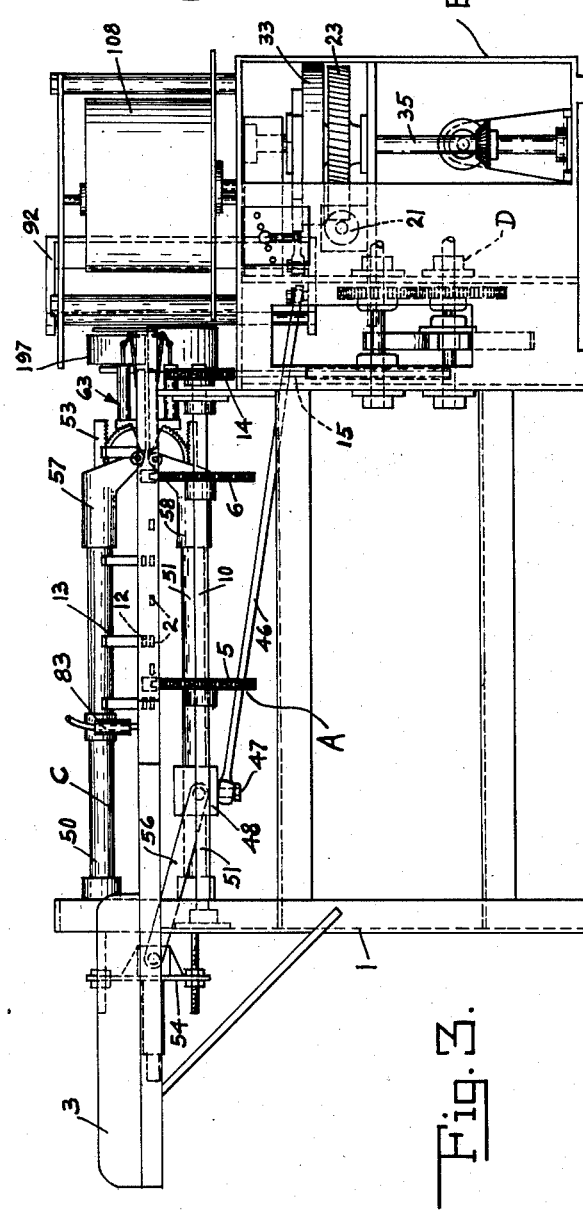
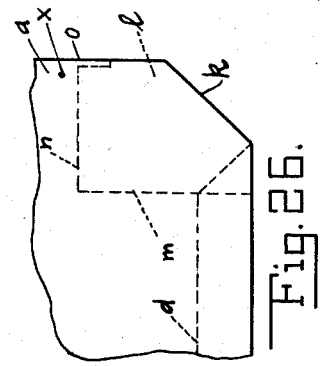
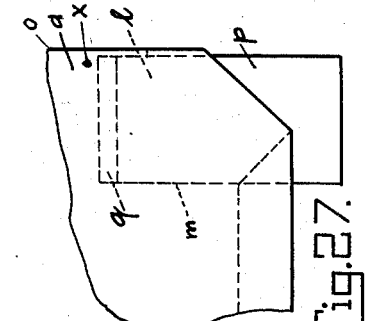
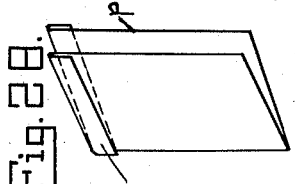
INVENTOR.
GEORGE W. MOSSOR.
BY
ATTORNEYS.

July 8, 1958 G. W. MOSSOR 2,842,032
SLEEVING APPARATUS FOR VALVED PAPER BAGS
Original Filed June 26, 1952 9 Sheets-Sheet 4
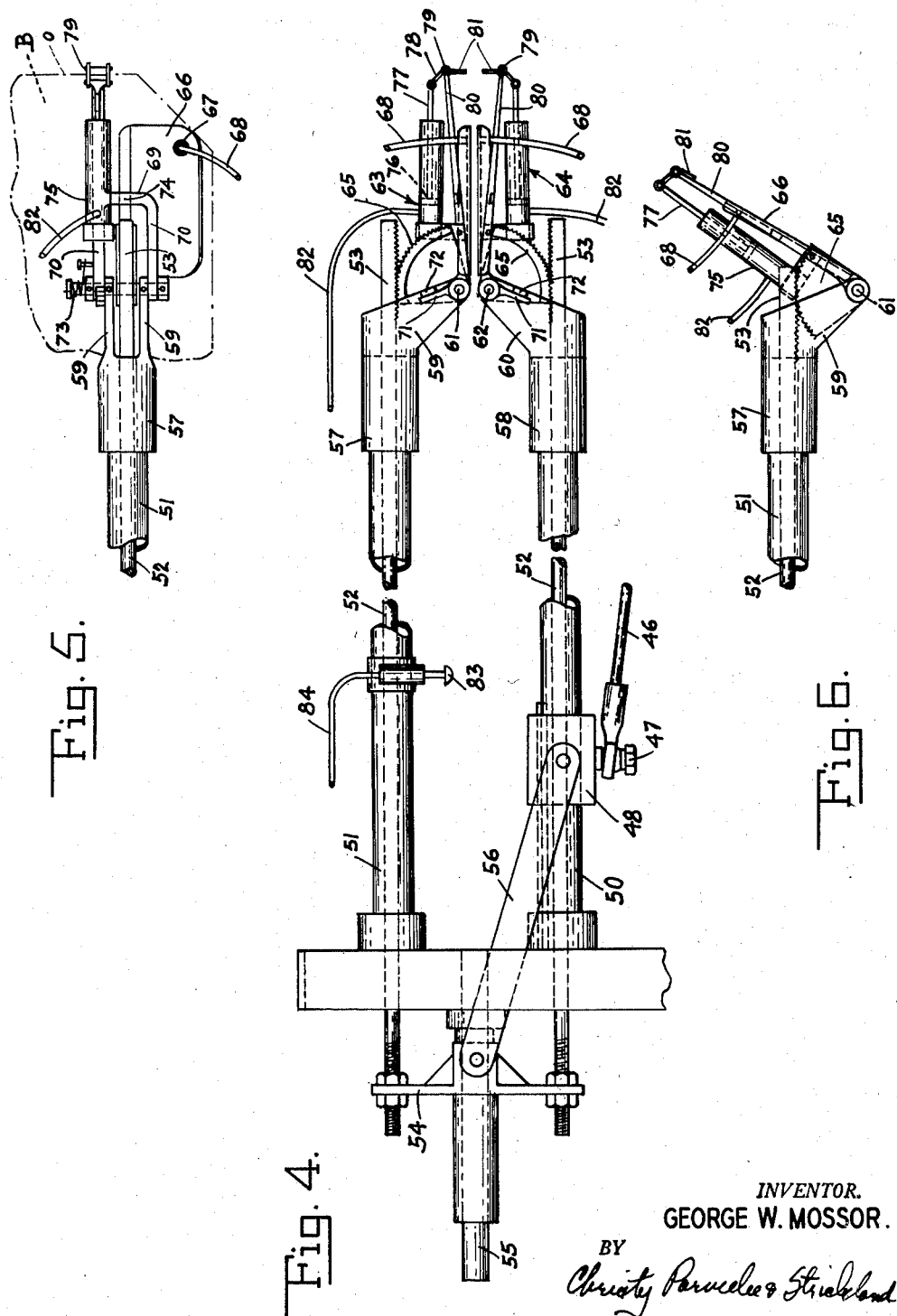
INVENTOR.
GEORGE W. MOSSOR.
BY
ATTORNEYS.

July 8, 1958 G. W. MOSSOR 2,842,032
SLEEVING APPARATUS FOR VALVED PAPER BAGS
Original Filed June 26, 1952 9 Sheets-Sheet 5
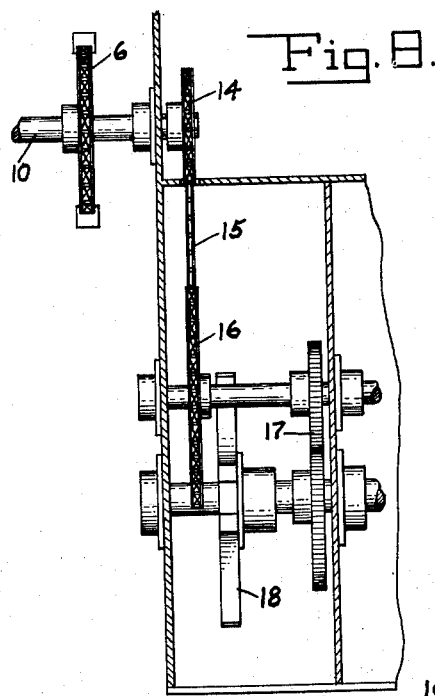
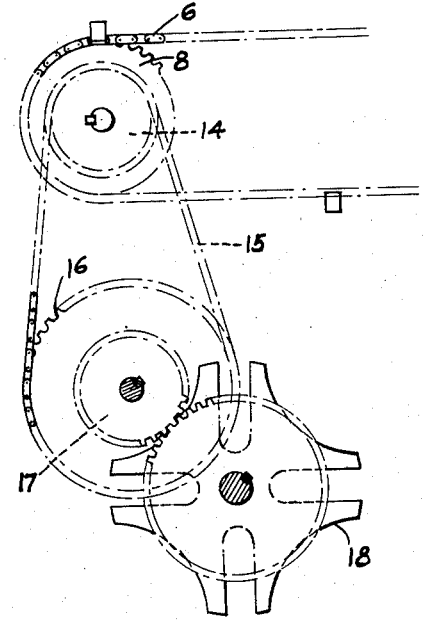
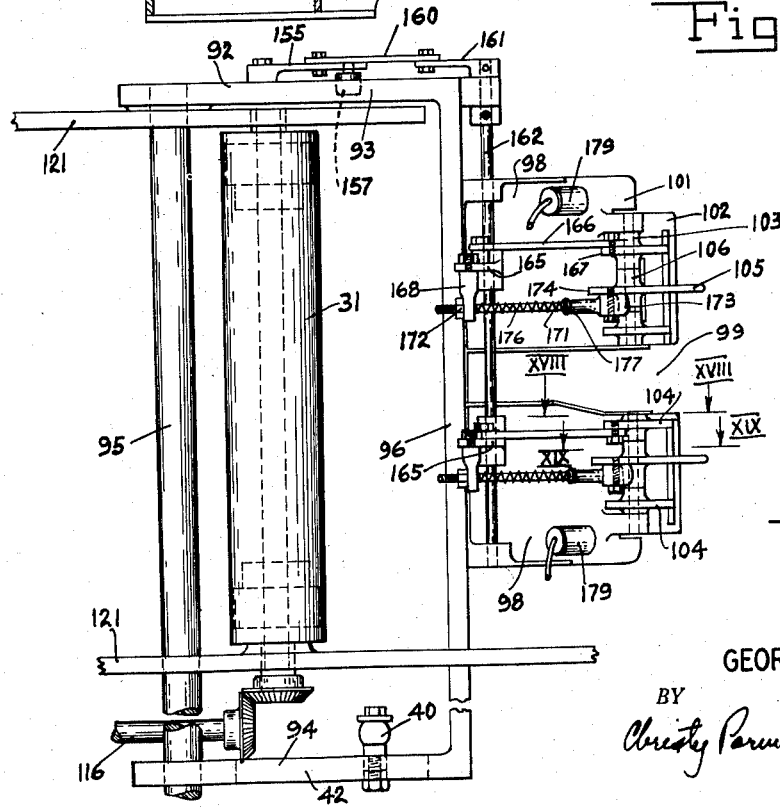
INVENTOR.
GEORGE W. MOSSOR.
BY
Christy Parmelee & Strickland
ATTORNEYS.

July 8, 1958     G. W. MOSSOR     2,842,032
SLEEVING APPARATUS FOR VALVED PAPER BAGS
Original Filed June 26, 1952     9 Sheets-Sheet 6
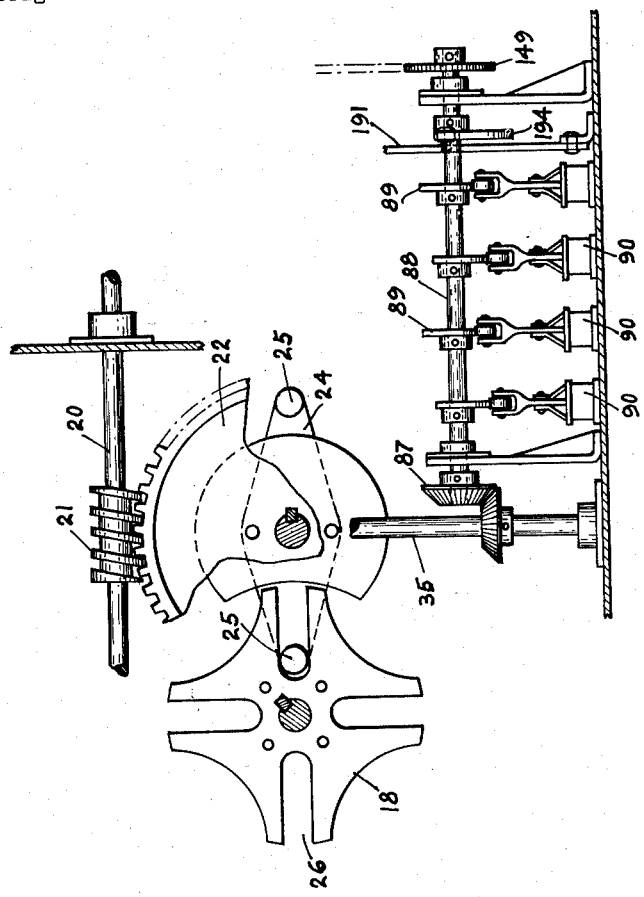
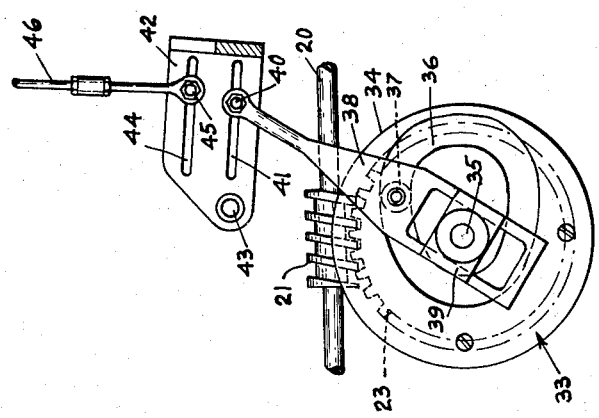
INVENTOR.
GEORGE W. MOSSOR.
BY
ATTORNEYS.

July 8, 1958 — G. W. MOSSOR — 2,842,032
SLEEVING APPARATUS FOR VALVED PAPER BAGS
Original Filed June 26, 1952 — 9 Sheets-Sheet 7

INVENTOR.
GEORGE W. MOSSOR.
BY
Christy Parmelee & Strickland
ATTORNEYS.

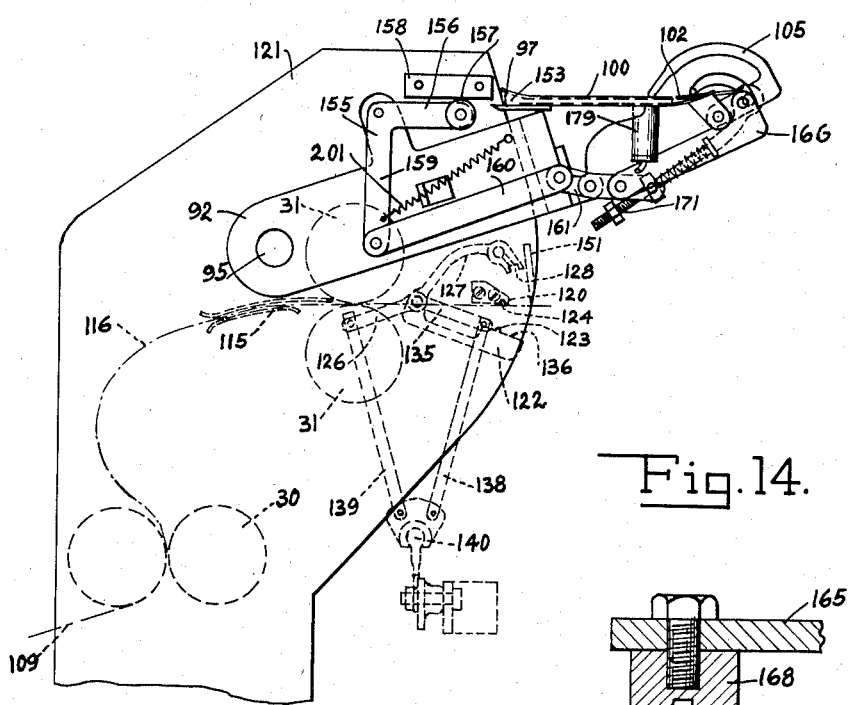

July 8, 1958 G. W. MOSSOR 2,842,032
SLEEVING APPARATUS FOR VALVED PAPER BAGS
Original Filed June 26, 1952 9 Sheets-Sheet 9
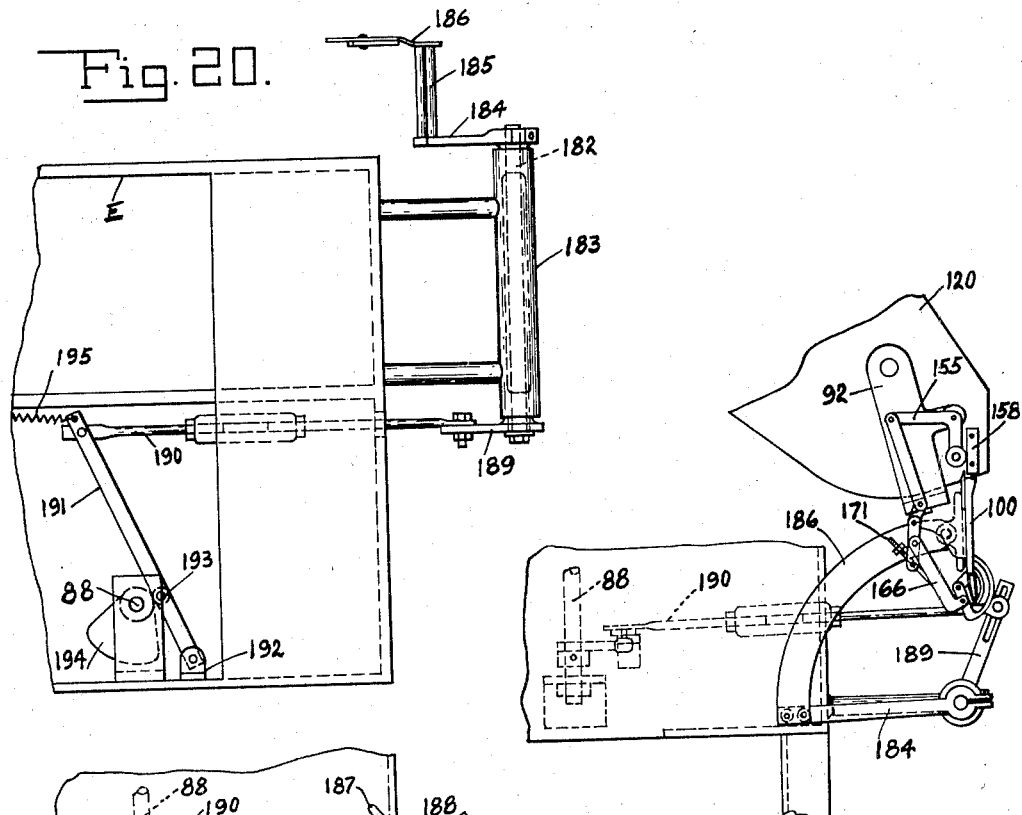
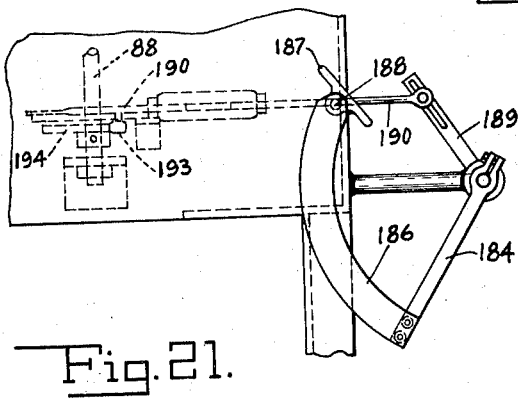
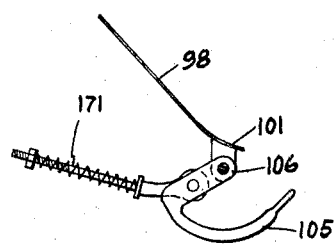
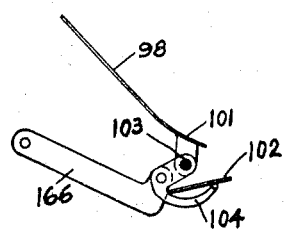
INVENTOR.
GEORGE W. MOSSOR.
BY
*Christy Parmelee & Strickland*
ATTORNEYS.

United States Patent Office 2,842,032
Patented July 8, 1958

2,842,032

SLEEVING APPARATUS FOR VALVED PAPER BAGS

George W. Mossor, Wellsburg, W. Va., assignor, by mesne assignments, to Hudson Pulp & Paper Corp., New York, N. Y., a corporation of Maine Continuation of abandoned application Serial No. 295,673, June 26, 1952. This application September 19, 1956, Serial No. 611,093

32 Claims. (Cl. 93—8)

This invention relates to an improved apparatus for cutting, shaping and assembling sleeves in the valves of paper bags. The instant application is a continuation of my prior application Ser. No. 295,673 filed June 26, 1952 and entitled Sleeving Apparatus for Valved Paper Bags, now abandoned.

The practice of providing valves in the corners of paper bags to facilitate filling with bulk materials is well known. Such valves are commonly formed by tucking in a corner of the bag to provide a relatively small opening into which a nozzle or spout may be inserted for the purpose of filling the bag with a bulk material. In order to retain the bulk material in the bag, it has been customary to provide a sleeve for the valve, the sleeve being in effect an extension of the valve which is connected to the inner edge of the valve and is doubled back thereon so that it projects outwardly through the valve opening. After the bag has been filled, the sleeve is pushed inwardly through the valve opening to a position in which it operates as a closure for the valve opening.

In the fabrication of paper bags with sleeved valves, the problem of applying the sleeve to the valve has been a particularly troublesome one. Heretofore, the assembly of the sleeve has been essentially a manual operation. While various forms of apparatus and methods have been proposed for the purpose of eliminating this manual operation, none of the proposals has proven entirely satisfactory, and the custom of applying the sleeves manually has continued.

One of the principal objects of this invention is to provide an improved apparatus and method for automatically forming and assembling sleeves into the valves of paper bags. To this end, there is provided an apparatus which will accept paper bags one by one at a high rate of speed, which will cut and shape sleeves for the valves of such bags, assemble such sleeves into operative position with respect to the bag valves, and then discharge the sleeved valve bag. These operations are effected in a timed sequential cycle of operations in a manner to be described.

In the drawings, there is shown a preferred embodiment of the invention. In this showing:

Fig. 3 is an end elevational view looking from the bottom of Fig. 1;

Fig. 4 is an enlarged fragmentary elevational view of the apparatus for spreading the paper bags looking in the same direction as Fig. 3;

Fig. 5 is a fragmentary plan view of a portion of the bag gripping mechanism shown in Fig. 4;

Fig. 6 is a fragmentary elevational view of a portion of the bag gripping mechanism shown in Fig. 4 and illustrating the parts in the position which they occupy when the bag has been spread to an open position;

Figs. 7 and 8 are fragmentary elevational views of the drive mechanism for the conveyor which delivers the bags to a sleeving position;

Fig. 9 is a fragmentary plan view of a portion of the drive for operating the bag gripping and opening mechanism;

Fig. 10 is a fragmentary elevational view of another portion of the drive mechanism and controls operated thereby;

Fig. 11 is an elevational view of the pivoted cutter which receives the sleeving paper and applies it to the valve;

Figs. 12 through 14 are fragmentary plan views of the apparatus shown in Fig. 11 illustrating the parts in different sequential positions;

Fig. 15 is a sectional view of a coupling member forming part of the operating mechanism shown in Figs. 11 through 14;

Fig. 16 is an elevational view of a portion of the apparatus shown in Fig. 11 but looking from an opposite side thereof;

Fig. 18 is a view taken substantially along the line XVIII—XVIII of Fig. 11;

Fig. 19 is a view taken substantially along the line XIX—XIX of Fig. 11;

Fig. 20 is a fragmentary elevational view of a portion of the apparatus for controlling the folding of the sleeve into its final operative position;

Fig. 21 is a plan view of the apparatus shown in Fig. 20;

Figure 12:
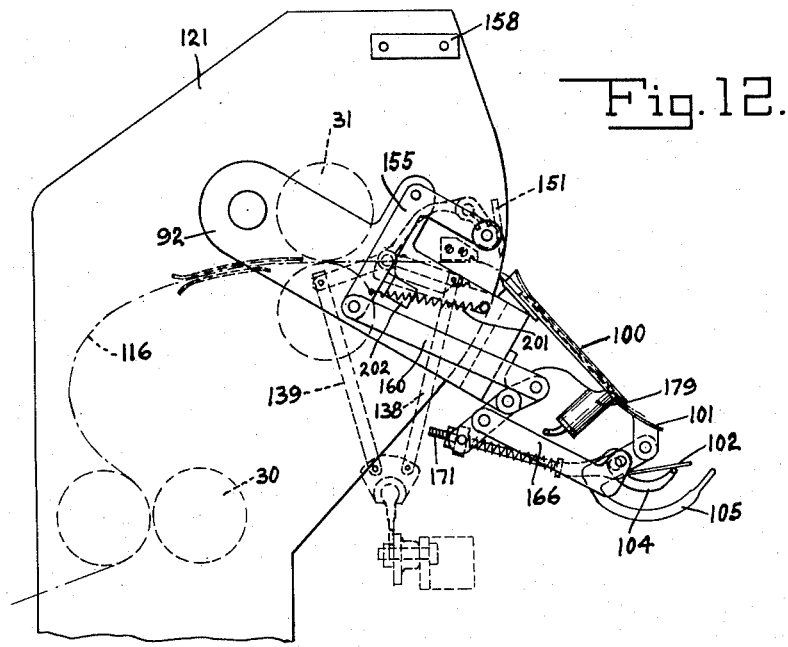
Figure 13:
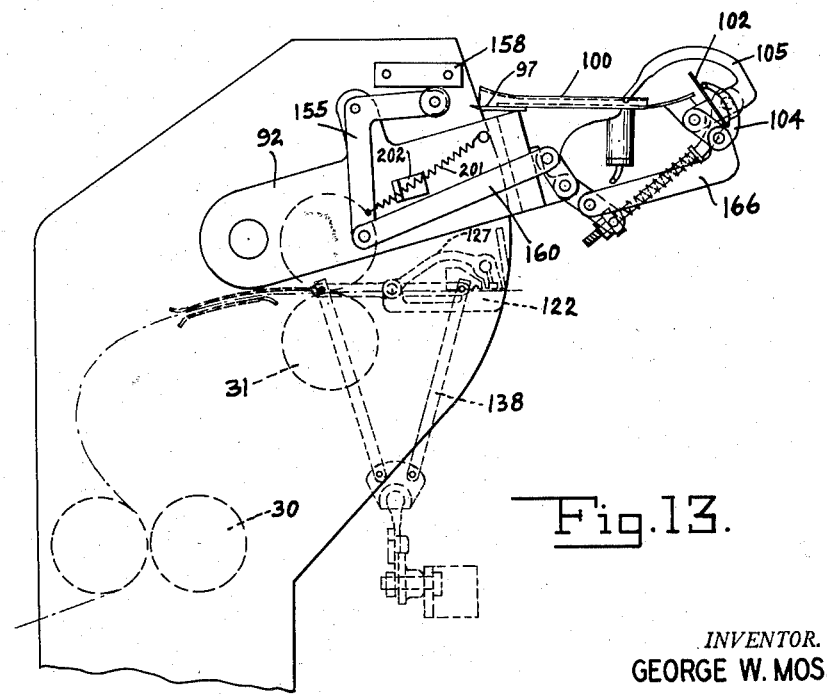

Fig. 22 is a view similar to Fig. 21 showing the parts in a slightly different position and showing the arrangement of such parts with respect to the apparatus shown in Figs. 12 through 14; and Figs. 23 through 28 are fragmentary and diagrammatical illustrations showing the construction of a conventional valved bag and the manner in which a sleeve therefor is formed and assembled into its operative position.

As has been pointed out above, the apparatus of this invention is adapted primarily to the fabrication and assembly of sleeves into the valved openings of paper bags. The structure of the sleeved valve is illustrated in Figs. 23–28. In this showing, the fragmentary illustration of a corner of a bag in Fig. 27 shows the structure of the completed product. The sleeved valve bag of Fig. 27 is comprised of a valved bag as shown in Fig. 26 and a sleeve as shown in Fig. 28. The apparatus of this invention, in a manner to be described, cuts, forms and assembles the sleeve of Fig. 28 into the bag of Fig. 26 to form the product of Fig. 27.

In order to explain the structure of a conventional valved bag as designated by the letter *a* in Figs. 26 and 27, reference will be first made to the showing of Figs. 23 through 25. In this showing, the letter *b* designates the blank from which the bag is formed, and on this blank the dot-dash lines designate the various folds which are made in producing the valved bag *a*. The blank *b* has parallel fold lines *c*, *d* and *e* centrally thereof which are arranged as shown in Figs. 24 and 25 to form a bag with opposite faces *f* and *g* having a gusset *h* at one edge thereof. A lip *i* at the edge of the bag is then folded inwardly along the lines *j* and *k* to produce the valve structure *l* shown in Fig. 26. This operation rotates the portion *m* of the fold line *d* which extends beyond the intersection of the lines *j* and *k* through an angle of 90° and to the position shown in Fig. 26 with the outer edge $n$ of the lip $i$ doubled on itself about the fold line $m$ and in the position also shown in Fig. 26. If the bag is then sewed along the vertical line $o$, there will be openings at $k$ and $n$, referring to Fig. 26, into the interior of the bag.

The sleeve for the valve $l$ is illustrated in Fig. 28 and is designated by the letter $p$. The sleeve comprises a flat sheet of paper folded on itself and having its upper edge turned downwardly to provide a lip at $q$. The sleeve $p$ is positioned on the valve $l$ with the lip $q$ lapping and securely fashioned by adhesive to the inner edge $n$ of the valve as illustrated in Fig. 27. This structure is a conventional valved bag structure which in operation is utilized as an opening to fill the bag with bulk materials. When the bag has been filled, a closure to prevent escape of the material through the valve $l$ is effected merely by pushing the sleeve $p$ inwardly into the bag through the opening $n$. Any tendency of material to escape thereafter will cause the sleeve to jam and obstruct the opening at $n$.

At this point, attention is directed to the fact that separation of the bag faces $f$ and $g$ by pulling them apart through the application of a pulling force at the point X will result in unfolding the sleeve $p$ and valve $l$ to a position in which the two halves thereof are in a common plane perpendicular to the sides of the bag and parallel to the end $o$ of the bag. Attention is directed to this feature of the valved bag since the apparatus of this invention grips the bag faces at the point X in separating the sides thereof to move the valve sides into a common vertical plane preparatory to the attachment of a sleeve $p$ thereto.

Figure 1:
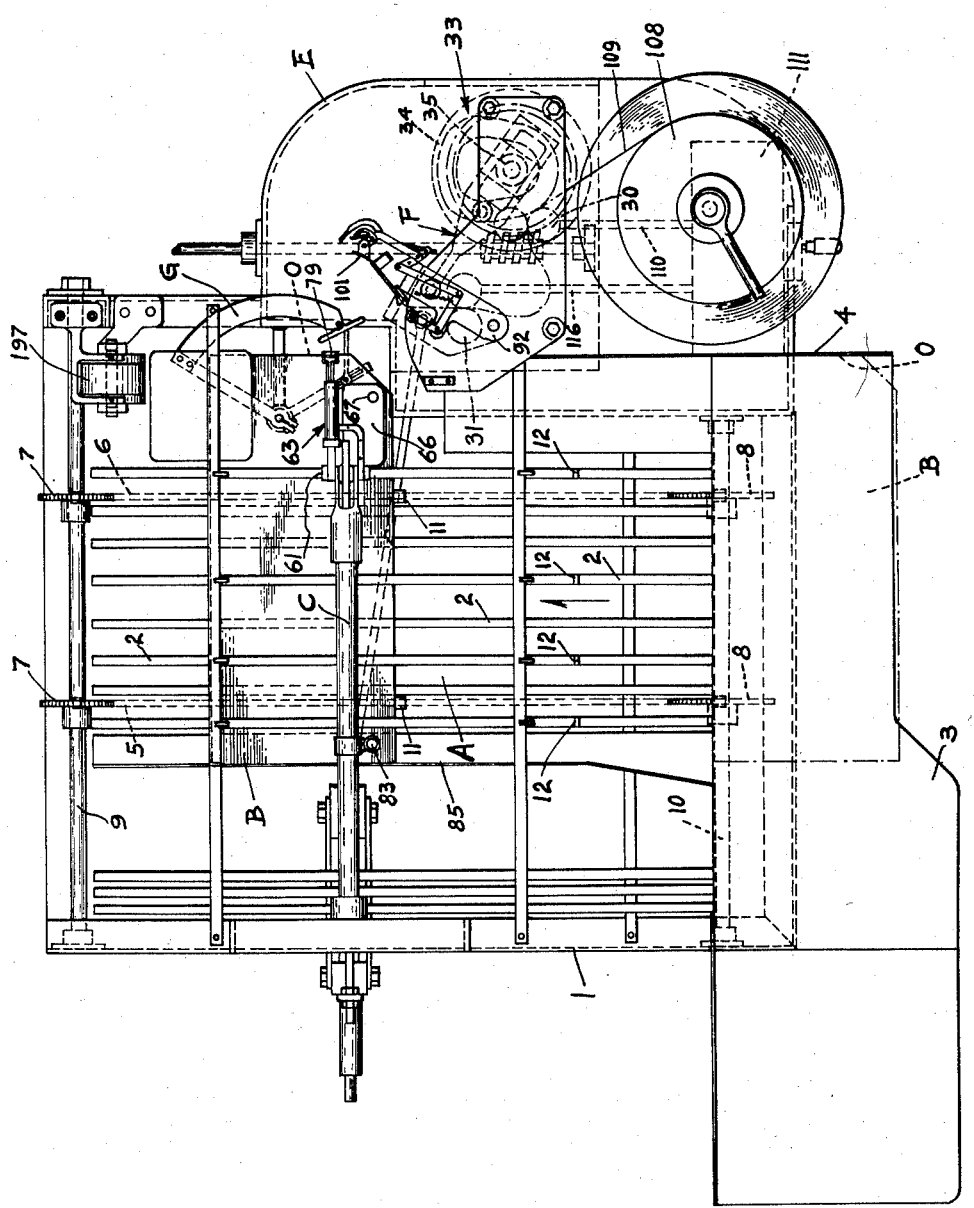
Fig. 1 is a plan view of an apparatus constructed in accordance with the principles of this invention.
Figure 2:
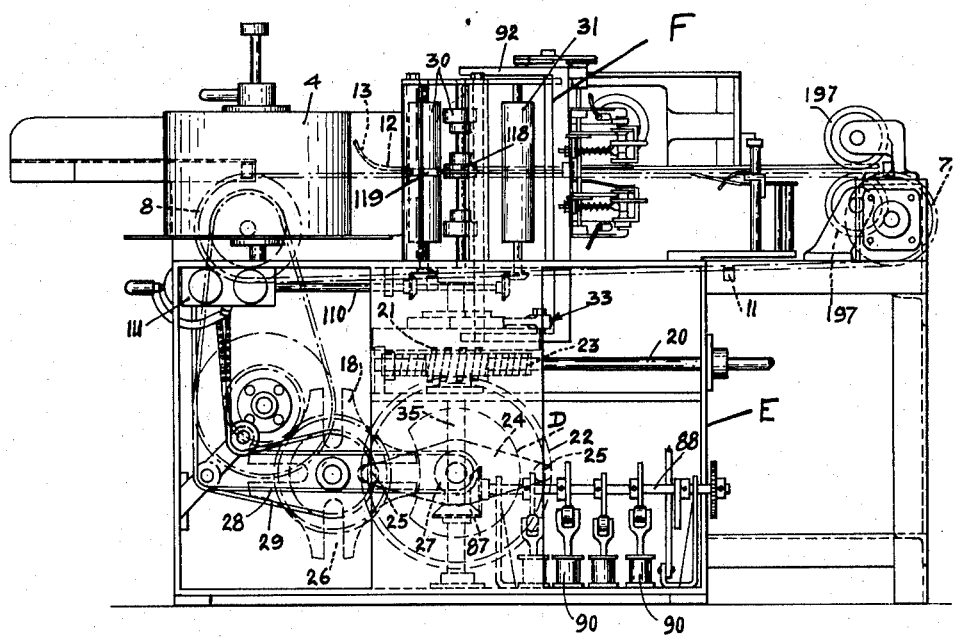
Fig. 2 is a side elevational view looking from the right of Fig. 1.

Referring now to Figs. 1, 2 and 3, the essential parts of the apparatus will be described first in a general manner. As shown in these figures, the apparatus comprises a conveyor rack A on which bags B are placed for delivery to a bag gripping mechanism C which grips and spreads the valve of a bag thereon in a manner to be described preparatory to the attachment thereto of a valve sleeve. The drive D for the conveyor rack is located in a housing E positioned to one side and underneath the conveyor rack A. Sleeve cutting and forming mechanism F is mounted on top of the housing E.

Generally stated, the bags are placed on and delivered by the conveyor rack A to a predetermined position where they are engaged and spread by the mechanism C to condition the valves for the attachment of a sleeve. While the bags are stationary and are held by the gripping mechanism C, the mechanism F is pivoted to cut and shape a valve sleeve, and in its final pivotal movement attaches the sleeve to the bag valve which is being held in a vertical plane by the mechanism in a manner to be described. As soon as the sleeve is attached in position, the bag sides are returned to a superimposed position and the valve and its attached sleeve are folded with the cooperation of folding apparatus indicated as a whole by the letter G. The letters A through G designate the essential parts of the apparatus of this invention, and these parts, as much as possible, are described below as separate units.

The structure of the conveyor rack A and its drive is best shown in Figs. 1, 2, 3, 7, and 8. Referring first to Figs. 1 and 3, the rack A is shown as being comprised of a supporting frame 1 on which a plurality of parallel slats 2 are mounted and over which bags may be slid in a manner to be described. A platform 3 is mounted at one end of the conveyor on which a stack of bags B may be placed in a position from which they may be readily fed manually, or otherwise, to a position on top of the slats 2 for movement upwardly in the direction of the arrow as viewed in Fig. 1. The rack has a guide rail 4 along one edge thereof against which the open end or edge $o$ of a valve bag may be placed to position the bag for forward movement over the rack slats 2.

To move the bags forwardly over the conveyor racks 2 in the direction of the arrow as shown in Fig. 1, spaced parallel sprocket chains 5 and 6 are provided. The chains 5 and 6 are trained over sprockets 7 and 8 respectively mounted on shafts 9 and 10 extending transversely of and underneath the slats 2. The chains 5 and 6 have transversely aligned pairs of lugs 11 at spaced intervals therealong, and the upper reaches of the chains are positioned at about the same level as the slats 2 so that the lugs 11 project above the upper surfaces of the slats 2 and are thus effective to engage with an edge of a bag B and slide it forwardly over the slats 2.

In order to hold a bag in position on the slats 2, runners 12 are positioned immediately above alternate slats 2. As best shown in Fig. 3, the forward ends of the runners 12 are curved upwardly as at 13 to facilitate movement of the leading edge of a bag into the space between the runners 12 and slats 2.

The chains 5 and 6 are driven intermittently in a timed sequential manner so that bags B will be delivered to the gripping mechanism C at equally spaced and timed intervals. To effect this movement of the chains 5 and 6, the sprockets 8 over which the chains are trained are keyed to the shaft 10 which has a drive sprocket 14 (see Fig. 3) at its inner end. As best shown in Figs. 7 and 8, the sprocket chain 15 for operating the sprocket 14 is trained over a sprocket wheel 16 which is driven by a gear train 17 from a Geneva wheel 18. The Geneva wheel 18 is driven from the main drive D in a manner to be described.

The drive D (referring to Fig. 2) is power driven and includes a drive shaft 20 which is coupled to a suitable power drive such as an electric motor and gear reducer unit (not shown). The inner end of the shaft 20 carries a worm 21 which has meshing engagement with a vertical worm wheel 22 and a horizontal worm wheel 23 (see Fig. 3). The worm wheel 22, although rotating constantly, effects an intermittent operation of the rack A as shown in Fig. 10 through the Geneva coupling including the Geneva wheel 18 and its driver 24. The Geneva driver 24 is keyed to the shaft mounting the vertical worm wheel 22 and carries a pair of pins 25 which engage in driving slots 26 in the Geneva wheel 18. By reason of this Geneva driving connection, the conveyor rack has two driving movements imparted thereto for each revolution of the worm wheel 22.

The shaft mounting the worm wheel 22 also mounts a sprocket 27 (see Fig. 2) for a constantly operating sprocket chain drive 28. An intermittent sprocket chain drive 29 is driven from a sprocket wheel mounted on a shaft carrying the Geneva wheel 18. The continuously operating sprocket drive 28 and intermittently operable sprocket drive respectively operate sets of feed rolls 30 and 31 constituting part of the sleeve cutting and forming mechanism F in a manner to be described.

The horizontal worm wheel 23 has a ratio with the worm 21 such that it makes two revolutions for every one revolution of the wheel 22. In other words, the worm wheel 23 will rotate once for each intermittent operation of the conveyor rack A. The worm wheel operates a cam drive designated as a whole by the numeral 33 (Fig. 2) which in turn actuates the bag gripping mechanism C in a manner to be referred to. Since the worm wheel 23 rotates once for each intermittent operation of the conveyor rack A, it will be apparent that the cam drive 33 will actuate the bag gripping mechanism C once for each operation of the rack conveyor A.

As best shown in Fig. 9, the cam drive 33 comprises a cam wheel 34 which is mounted on the shaft 35 which is rotated by the worm wheel 23 keyed thereto. The cam wheel 34 includes a cam trackway 36 in which a cam roller 37 is received. The roller 37 is secured to an actuating member 38 which has a sliding connection with a coupling member 39 pivotally mounted on the upper end of the shaft 35. The actuating member 38 has a pivot pin 40 at its outer end which is slidably received in a trackway 41 in a lever 42 which has a pivot at 43 mounting it on the apparatus frame 1 or other suitable stationary support. The lever 42 has a second trackway 44 in which a pivot pin 45 at the end of an actuating rod 46 is pivotally receivable. The actuating rod 46, as best shown in Fig. 3, is connected through a pivot pin 47 with a driving member 48 for the bag gripping mechanism C. For each rotation of the cam wheel 34, the actuating member 38 will pivot and slide with respect to the end of the shaft 35 to impart one complete pivotal movement to the lever 42 to thereby reciprocate the drive member 48 and operate the bag gripping mechanism C once for each intermittent operation of the rack conveyor A.

The construction of the bag gripping mechanism C will be best understood by referring to Fig. 3 in conjunction with the showings of Figs. 4 through 6. As there shown, the mechanism C comprises a pair of hollow supporting members 50 and 51 mounted on and extending transversely of the frame 1. The lower member 50 is mounted directly underneath and parallel to the upper member 51 and the slats 2 of the rack conveyor extend transversely of the parallel members 50 and 51 and through the space therebetween. Each of the members 50 and 51 has an actuating rod 52 extending therethrough for operating racks 53 mounted on their outer ends adjacent the sleeve forming apparatus F, the outer ends of the rods 52 and the racks 53 extending beyond the terminal ends of the members 50 and 51 in which they are mounted. The other ends of the members 50 and 51 are connected together and actuated by a coupling member 54 which is mounted for sliding movement on a support 55 mounted on the frame 1. A link 56 has pivotal connections at its ends to the coupling member 54 and actuating member 48 which is mounted for sliding movement on the lower member 50. By reason of the link 56, the coupling member 54 will be reciprocated to actuate the racks 53 each time the slide 48 is operated by the actuating rod 46.

The unconnected ends of the transversely extending tubes 50 and 51 adjacent the sleeve forming mechanism F respectively are provided with upper and lower supports 57 and 58. The upper support 57 has a pair of downwardly extending arms 59 and the lower support 58 has a similar pair of upwardly extending arms 60. The pairs of arms 59 and 60 respectively mount an upper pivot pin 61 and a lower pivot pin 62. Each of the pins 61 and 62 mounts similar upper and lower bag gripping units 63 and 64 for clamping engagement with opposite faces f and g of a bag adjacent its open end o in a manner to be described.

Each of the gripping devices 63 and 64 includes a gear segment 65 pivoted on a pivot pin 61 or 62 and having meshing engagement with a rack 53. The gear segments 65 are keyed to their pivot pins so that the pivot pins 61 and 62 rotate in their supporting members 59 and 60. Each of the segments 65 has a vacuum plate 66 attached to its bottom for movement therewith. Openings through the plates 66 are connected by fittings 67 with conduits 68 connected to a source (not shown) of sub-atmospheric pressure. In this manner, opposite faces f and g of a bag positioned between the plates 66 will be drawn against and be held against the facing surfaces of such plates when the conduits 68 are connected to the source of vacuum to withdraw air from the facing surfaces of the vacuum plates 66. With the opposite faces f and g so held, it will be apparent that such faces will be spread apart by initial movement of the segments 65 from the position shown in Fig. 4. As will be described below, controls are provided for effecting connection of the conduits 68 with the source of vacuum just prior to initial movement of the segments 65.

Each of the pins 61 and 62 has a fork-shaped frame 69 with arms 70 suitably connected thereto for pivotal movement independent of the segments 65. A finger 71 is secured to the end of each arm 70 for pivotal movement therewith. The fingers 71 engage stationary stops 72 which limit pivotal movement of the frames 69. Springs 73 bias the pivotal movement of the frames 69 to a position engaged with the plates 66 so that the frames 69 will pivot with the segments 65. This pivotal movement of the frames 69 beyond the position shown in Fig. 4 is limited by engagement of the fingers 71 with the stops 72. After a small initial movement of the segments 65 and plates 66 out of the position shown in Fig. 4, the plates 66 will engage with the under side of a connecting bar 74 extending transversely of the arms 70 so that continued movement of the segments 65 will carry along the frames 69 against the action of the biasing springs 73. The frames 69 each carry an air cylinder 75 having a piston 76 mounted therein. The pistons 76 each have an outwardly extending piston rod 77 having a pivotal connection at its end to one arm of a bell crank lever 78 which has a central pivotal connection at 79 to the end of a mounting finger 80. The free arm 81 of each bell crank lever is adapted to pivot and grip a bag face against the mounting finger 80 when air is admitted to the cylinder 75 through an air supply conduit 82. Fig. 6 shows the extended position of one of the rods 77 with its clamping arm 81 in engagement with the mounting finger 80.

The upper tube 51 mounts a bag clamp 83 having an air actuating cylinder operated by an air supply conduit 84. When the rack conveyor moves a bag to an operative position for engagement by the gripping mechanism C, the clamp 83 is operated to clamp the bag against a supporting member 85 underneath the outer end of the bag as viewed in Fig. 1.

Referring to Fig. 1, it will be noted that the guide ledge 4 extends along a line substantially coinciding with the ends of the gripping fingers 80. The tubes 50 and 51 and the pivot pins 61 and 62 are arranged so that the end o of the bag B will be positioned slightly to the left of the pivot 79 and gripping fingers 81 when it is moved by the conveyor A to an operative sleeve receiving position. The operative parts of the bag gripping mechanism C are in the relative positions shown in Fig. 4 when the bag is moved to an operative sleeve receiving position. As it moves to such position, it will be noted that the facing surfaces of the plates 66 are positioned sufficiently far apart that the bag may be readily moved therebetween. Initial spreading action of the opposite bag faces f and g is effected by the plates 66 upon application of the suction applied through the vacuum connection 68 in a manner to be described. This initial separation is essential to enable the mounting fingers 80 and gripping fingers 81 to effectively engage with the opposite faces of the bag sides f and g about the edge o preparatory to effecting a further separation of such faces to move the sleeve l into a vertical plane parallel to the bag end.

Referring again to Figs. 2 and 10, the lower end of the vertical shaft 35 is shown as having a one-to-one gearing connection 87 with a cam shaft 88. The cam shaft 88 thus makes one revolution for each intermittent operation of the rack conveyor A. The cam shaft 88 mounts a plurality of control cams 89 which respectively actuate control valve mechanisms 90 to effect a proper sequential operation of various pneumatic and vacuum connections for the clamping cylinder 83, the finger operating cylinders 75, and the vacuum connection 68 in a manner to be described.

It will be recalled that the sleeve cutting, shaping and applying apparatus has been designated as a whole by the letter F above. This apparatus comprises a frame 92 which is pivotally mounted on the stationary housing E. As best shown in Fig. 11, the frame 92 comprises an upper supporting arm 93 and a lower supporting arm 94 pivotally mounted on a shaft 95 extending vertically of the housing E, the supporting arm 94 being the operating lever 42 of Fig. 9. The arms 93 and 94 mount a vertically extending support 96 at their outer end. The support 96, as best shown in Fig. 16, has secured thereto a vertically extending cutter bar 97 and vertical paper receiving plates 98 which are separated from each other by a space 99. The surfaces of the plates 98 and cutter bar 97 as viewed in Fig. 16 constitute a flat and vertically extending surface onto which is fed the paper from which the sleeve blank is to be cut. The vertical plates 98 are provided with upper and lower guides 100 which receive the edges of a strip of paper fed onto the plates 98 to hold the paper in position against the vertical surfaces of such plates. Curved plates 101 are positioned at the exit ends of the guides 100 for training the edge of the paper outwardly with respect to the flat surfaces of the plates 98. A folding plate 102 is pivotally mounted by a pair of spaced bosses 103 at the outer edge of each vertical plate 98 for doubling the outer edge of a sleeve on itself to form the sleeve lip q of Fig. 28. Each of the plates 102 is secured to the bosses 103 by a pair of vertically spaced fingers 104. A holding finger 105 is positioned between each pair of fingers 104 and is mounted for pivotal movement independently of the fingers 104 by a boss 106 for movement to a holding position in a manner to be described.

The sleeve paper is fed to the plates 98 over the cutter bar 97 from a reel 108 (see Fig. 1) mounted on the upper surface of the housing E. As a paper strip 109 leaves the reel 108, it is passed between the feed rolls 30. As has been explained above, the feed rolls 30 are continuously operated, and this operation is effected by a drive shaft 110 (see Fig. 2). The shaft 110 has a gearing connection (not shown) with the continuously operating sprocket drive 28 through a gearing connection (not shown) in a speed-change transmission unit 111. The paper leaving the feed rolls 30 is delivered to the second set of feed rolls 31 by stationary guide plates 115. The feed rolls 31 are intermittently operated by a drive shaft 116 (see Fig. 1) having a gearing connection (not shown) with the intermittent sprocket chain drive 29 of Fig. 2 through the speed change transmission unit 111. Due to the fact that the feed rolls 30 are continuously operated, and the rolls 31 are intermittently operated, the paper 109 will build up in a loop 116 between intermittent operations of the feed rolls 31. The formation of the loop of paper between the rolls 30 and 31 prevents a sudden pull on the reel due to sudden feeding operations.

Referring to Fig. 2, it will be noted that one of the feed rolls 30 is a skeleton roll while the other roll is a solid roll. The skeleton roll has an annular ridge 118 which is received in an annular groove 119 in the solid roll 30. The ridge 118 thus creases the sleeve paper along a center line to facilitate folding and subsequent formation of the valve sleeve. Only one roll of each of the pairs 30 and 31 is positively driven from the drive shafts 110 and 116, the other roll being rotated by frictional engagement with the paper passing therebetween.

When the paper leaves the feed rolls 31, it passes in front of vertical stationary grooving standard 120. As will be apparent from Fig. 14 in connection with Fig. 17, the ends of the grooving standard 120 are secured to upper and lower stationary supporting plates 121. The plates 121 pivotally support a bracket 122 carrying a grooving tongue 123 adapted to enter the groove 124 in the standard 120. When the tongue 123 enters the groove 124, the sleeving paper therebetween will be scored along a vertical line to facilitate folding to form the lip q of Fig. 28. The lower end of the pivoted bracket 122 extends through the lower support 121 and carries an operating lever 126.

A pivoted pasting bracket 127 is mounted concentrically with respect to the creasing bracket 122. The bracket 127 extends vertically and has a vertically extending groove 128 into which paste is fed through plural openings 129 from a supply tube 130. The ends of the supply tube 130 are connected with a paste supply conduit 131 and return conduit 132 which maintain the tube filled with paste at all times. The lower end of the pasting bracket 127 extends downwardly through the lower support 121 and out through an opening formed centrally of the lower end 134 of the bracket 122. The lower end of the bracket 127 is provided with an operating lever 135. The pivoted bracket 122 is provided with a flat surface 136 against which the face of the bracket 127 carrying the groove 128 will move when the brackets 127 and 122 are pivoted toward each other. A trough (not shown) may be provided at the base of the groove 128 with a connection to the tube 132 for removing excess paste which drips from the groove 128.

Figure 17:
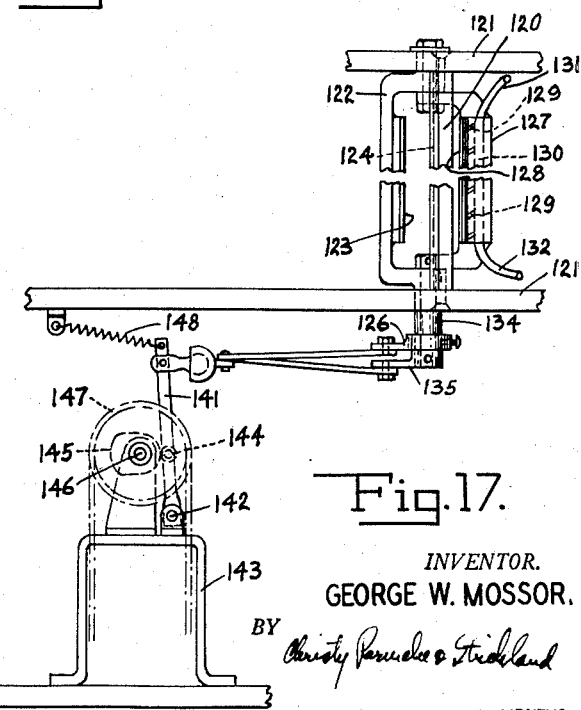
Fig. 17 is a fragmentary elevational view of an apparatus for grooving and applying a strip of paste to the valve sleeves, this apparatus while shown diagrammatically in Figs. 12–14 not being shown in the assembly views of Figs. 1–3.

Pivotal movement of the brackets 127 and 122 in opposite directions is effected by a pair of links 138 and 139 having pivotal connections at their outer ends to the bracket operating arms 126 and 135. The other ends of the links 138 and 139 have a pivotal connection with a universal coupling 140 which in turn has a pivotal connection with an operating lever 141 as shown in Fig. 17. The lever 141 has a pivot connection 142 at its lower end to a supporting bracket 143 and carries a roller 144 which is engaged with a cam member 145 mounted on a shaft 146 driven by a sprocket drive 147. Spring 148 provides a bias for maintaining the roller engaged with the cam 145. The sprocket drive 147 is driven by a sprocket wheel 149 mounted on the cam drive shaft 88 (see Fig. 10) so that the lever 141 will be pivoted to the right as viewed in Fig. 17 for each cycle of operation. Pivotal movement of the lever 141 in this manner will rotate the arms 126 and 136, as viewed in Fig. 14, in opposite pivotal directions to thereby pivot the ridge 123 into the groove 124 to crease the lip q of the sleeve, and to move the pasting groove 128 into engagement with the surface of the sleeve lip q for applying a strip of paste thereto.

A stationary cutting blade 151 (see Fig. 14) is mounted in position for cooperation with the blade 97 mounted on the pivoted bracket 96. The stationary cutting blade 151 is positioned so that the end of a sleeve p will be formed when the pivoted bracket 92 is rotated about its pivot support 95. Although the cutting edges of the blades 98 and 151 extend vertically, it will be understood that they may be arranged at an angle with respect to the vertical so as to cut the sleeve on a bias if desired. It will of course be understood that a sleeve is cut each time the support 92 is pivoted from the position shown in Fig. 12 to the position shown in Fig. 14.

Intermittent operation of the rolls 31 is effected when the bracket support 92 is in a position, as shown in Fig. 12, with the leading ends 153 of the guides 100 just opposite the point of the stationary cutting blade 151. When the ends 153 are just opposite this point, rotation of the feed rolls 31 will feed a blank of paper onto the vertical faces of the plates 98 and the cutters 97. When this feeding operation is stopped, the bracket support 92 is rotated to sever the blank from the strip of paper extending back to the reel 108.

As the bracket support 92 is rotated beyond the point at which the paper is severed, the fingers 105 are rotated to clamp the sleeve against the plates 98, as shown in Fig. 13, and the pivoted folding plates 102 are moved to fold the lip q on the body of the sleeve p, as shown in Fig. 14. The mechanism for effecting these operations is shown in Figs. 11 through 14 and comprises a bell crank lever 155 pivoted to the top of the bracket support 92. One arm 156 of the bell crank lever carries a roller 157 which engages with a stop 128 mounted on the upper support 120, engagement of the roller 157 and stop 158 causing rotation of the lever 155 upon continued rotation of the pivoted support 92. Reverse rotation of the lever 155 upon return movement of the support 92 is effected by a biasing spring 201. A stop 202 engages the other arm 159 of the bell crank lever 155 to limit its rotational movement under the influence of the biasing spring 201. The other arm 159 has a pivotal connection with a link 160 which is connected at its outer end to a lever 161 secured to the upper end of a rotatable actuating shaft 162 carried by the pivotal bracket support 92. Rotation of the shaft 162 rotates the two operating levers 165 which are secured to the shaft 162 for rotation therewith. A link 166 has pivotal connections with the lever 165, and an extension 167 on the bosses 103 so that counter-clockwise rotation of the shaft 162 is effective to rotate the folding plates 102 in a similar direction to fold the lip $q$ back on the body of the sleeve $p$ as shown in Fig. 28.

To operate the holding fingers 105 the outer ends of the levers 165 have depending parts 168 having an opening 169 therein in which a trunnion 170 is jouraled for pivotal movement about a vertical axis as best shown in Fig. 15. The trunnion 170 provides a sliding support for a rod 171 having a stop-nut 172 threaded on one end thereof. The other end of the rod 171 has a pivotal connection at 173 to an extension 174 of the boss 106 for imparting pivotal movement to the boss 106 and finger 105 upon movement of the rod 171 to the right as viewed in Fig. 11. A spring 176 is positioned between the member 168 and a collar 177 and is effective to transmit a resilient driving force to the rod 171 upon rotation of the lever 165 and part 168 in a counterclockwise direction. Due to the location of the part 168 on the outer end of the lever 165 as compared to the pivotal connection of the link 166 thereto at a point radially inwardly of the part 168, initial movement of the actuating rod 162 is effective to impart a greater movement to the holding finger 105 than is imparted to the folding plate 102. Consequently the fingers 105 are swung around to a position in which they clamp the opened valve bag L against the sleeve paper and in-turn the sleeve against the plate 98 substantially in advance of initial folding movement of the folding plates 102. When the ends of the fingers 105 engage the paper, continued rotation of the rod 162 will be effective only to compress the spring 176. The structure of the parts shown in Fig. 15 connecting the depending element 168 to the rod 171 enables a combined pivotal and sliding movement of the rod 171 relative to the trunnion 170.

Referring again to Fig. 11, it will be noted that there is an air cylinder 179 mounted on the back of each of the plates 98. The air cylinders 179 are for the purpose of operating clamping pins (not show) to clamp the edges of the sleeve paper in the guides 100, the clamping pins being projected actually forwardly for engagement with the inner surface of the guides 100 as at 180 in Fig. 16.

The folding mechanism G is best shown in Figs. 20 through 22 to which reference will now be made. As there shown, the mechanism G comprises a shaft 182 rotatably supported in a bracket 183 secured to the housing E. The upper end of the shaft 182 has a lever 184 secured thereto, and which mounts an upright 185 at its outer end. An actuating member 186 of arcuate shape is mounted on the upper end of the upright 185 and has a folding plate 187 pivotally connected to its outer end. The folding plate 187 is in the nature of a bar and has a straight edge 188 located in a horizontal plane for engagement centrally of the sleeve to insure folding of it about its center line, it being recalled that the sleeve was creased by the parts 118 and 119 on the feed rolls 30 in feeding the sleeve stock to the pivoted cutter. The lower end of the rod 182 has an actuating lever 189 secured thereto. The outer end of the lever 189 has a pivotal connection with an actuating rod 190 which has its inner end pivotally connected to an operating lever 191. The lower end of the lever 191 has a pivotal connection to a stationary standard 192 and has a roller 193 which rides on an operating cam 194. A spring 195 provides a bias for mounting the roller 193 engaged with the operating cam 194. As shown in Fig. 10, the cam 194 is mounted on the cam shaft 88 so that the folding mechanism will be operated once during each cycle of operations. This mechanism is actuated at the end of the cycle of operations, and is effective to rotate the member 187 through the space 99, see Fig. 16, between the plates 98 from the position shown in Fig. 21 to the relative position shown in Fig. 22 and into engagement with a sleeve $p$ which has been applied to a valve $l$. The straight edge 188 is thus made effective to hold the sleeve against movement away from the valve $l$ by its guides 100 when the supporting bracket 92 is pivoted away from its final position as shown in Figs. 14 and 22.

A pair of pinch rolls 197 (see Figs. 1 and 2) are mounted at the end of the rack conveyor A. At each intermittent operation of the conveyor A, a bag is fed between the pinch rolls which will operate to eject the bag from the apparatus, the rolls 197 having a power drive (not shown) for effecting positive rotation thereof. In addition to ejecting the bag, the rolls 197 apply sufficient pressure to the sleeved valve to flatten its folds and insure proper engagement of the sleeve lip $q$ with the valve lip or edge 10.

The operation of the apparatus is as follows:

The cycle of operations begins with the actuation of the conveyor A to move a bag into an operative position for engagement by the gripper mechanism C. This operation as explained above is effected by rotation of the Geneva wheel 18 to impart an intermittent movement to the sprocket drive 15 for the rack conveyor. This initial movement is also effective, as explained above, through the speed reduction transmission 111, and the drive shaft 116, to rotate the feed rolls 31 to feed a strip of paper onto the plates 98.

As the bag moves into position with its valved corner between the suction plates 66 of the gripping mechanism C, and its edge O positioned slightly inwardly of the pivots 79, as shown in Fig. 5, one of the control valves 90 is operated by rotation of the cam shaft 88 to supply air to the clamping cylinder 83 to clamp the bag against the support 85. At about the same time, the cam 145 in Fig. 17 actuates the two pivoted brackets 122 and 127 to score the end of the strip of sleeve paper and to apply paste along the lip of the next sleeve to be fed to the pivoted carrier 98. Also at this time, another of the controls 90 is actuated to apply suction through the openings 67 to the facing surfaces of the plates 66 so that opposite faces $f$ and $g$ of a bag will be drawn against such surfaces by the air rushing into the vacuum connections 67.

Just after vacuum is applied in this manner, the cam drive 33 operates to pivot the arcuate segments 65 (see Fig. 4) and move the plates 66 attached thereto away from each other to effect an initial separation of the bag faces $f$ and $g$. As pivotal movement of the plates 66 is continued, they engage with the brackets 69 and pivot such brackets to move the cylinders 75 away from each other. Just after the bag sides are separated sufficiently in this manner to move them into engagement with the mounting fingers 80 and to move the edges $o$ of the faces $f$ and $g$ beyond the free ends of the clamping fingers 81, another control valve 90 is actuated by its operating cam 89 to admit air to the cylinders 75 to thereby extend the piston rods 77 and clamp the fingers 81 against the end of the mounting finger 80 as shown in Fig. 6. The fingers 80 and 81 thus securely engage the ends of the bag and are effective to spread the bag to move its valve into a vertical plane upon continued pivotal movement of the mounting finger 80 to its final position as in Fig. 6.

Just after the paper is fed onto the sleeve supporting plates 98, another cam actuated control valve 90 operates to admit air to the cylinders 179 to thereby project the pins 180 toward the inner surfaces of the sleeve guides 100 and thus secure the sleeve in position on the support 98.

Operation of the cam drive 33 to operate the clamping mechanism C is also effective to pivot the sleeve supporting bracket 92 in a counter-clockwise direction as viewed in Fig. 1. Initial pivotal movement of the supporting bracket 92 moves the knife 97 by the stationary knife 151 to sever the sleeve on the support 98 from the strip of sleeve paper extending back to the reel 108. When the bracket support 92 moves to the position shown in Fig. 13, the sleeve on the face of the supporting plates 98 will be positioned against the bag valve *l* which will be in the vertical plane to which it was moved by the pivoted gripping units 63 and 64. Just prior to movement of the pivoted bracket 92 into the position shown in Fig. 13, the roller 157 on the bell crank bracket 156 will have engaged the stop 158 to actuate the rod 171 to thereby swing the clamping fingers 105 to the position illustrated in Fig. 13. As the clamping fingers 105 move into this position, they rotate in back of a bag valve *l* and thus move the bag valve into tight engagement with the sleeve on the support 98, and hold the sleeve and valves together while the lip *q* of the sleeve is folded over and pasted on the end of the valve *l*, it being recalled that paste was applied to the lip *q* by the bracket 127 in the previous cycle of operations.

As the pivoted supporting bracket 92 moves from the position shown in Fig. 13 to its final position as shown in Fig. 14, the folding plate 102 operates to fold the lip *q* into engagement with the inner surface of the bag and valve *l* so that the paste on the lip *q* will be effective to secure the sleeve to the valve.

As the pivoted supporting bracket 92 moves into the final position shown in Fig. 14, the folding member 187 is rotated to engage the sleeve along its previously creased center line. The cam drive 33 then functions to pivot the gripping units 63 and 64 to their initial position as shown in Fig. 4. As this return movement is started, the edge 188 of the folding member 187 prevents movement of the center line of the sleeve and valve toward the mechanism F as viewed in Fig. 1 and thus insures simultaneous folding of the valve *l* and attached sleeve *p* about the fold line *m* of Fig. 27. While this return movement is taking place, the pivoted supporting bracket 92 is being returned to its initial position as shown in Fig. 12. During this return movement, the supporting plate 98 is moving away from the sleeve thereon, and the sleeve is prevented from moving with the supporting bracket 98 by the folding member 187. In this manner, engagement of the folding member 187 is effective to pull the edges of the sleeve laterally out of the edge guides 100 on the supporting plates 98. Just prior to the completion of these return movements, the cam 194 (see Fig. 20) operates to release the actuating mechanism for the folding member 188 and render the spring 195 effective to return the parts to the position shown in Fig. 21.

During the return movements of the clamping mechanism C, and the pivoted supporting bracket 92 by the cam drive 33, the cam controls 90 operate to disconnect the elements controlled thereby from the source of vacuum and air supply and thereby complete the operations necessary to set the apparatus up for another cycle of operations. A subsequent cycle is then started by operation of the Geneva gear 24 by one of the driving pins 25 to actuate the rack conveyor A to move the bag with attached sleeve out from under the gripping mechanism C and to deliver a new bag to an operative position under the gripping mechanism C for a repetition of the operations just described.

Attention is particularly directed to the fact that the valve *l* is positively held in a vertical plane during the time that the sleeving apparatus F is applying a sleeve thereto. In this respect, it will be recalled that spreading or opening movement of the bag sides *f* and *g* is a compound movement comprised of an initial opening movement and a final opening movement. The initial opening movement is effected by the vacuum plates 66 and need be sufficient only to allow movement of the gripping fingers 81 into engagement with the inner surface of the sides *f* and *g*. The final opening movement is effected with the bag sides *f* and *g* securely clamped between the gripping fingers 80 and 81 adjacent the point X, and this clamping support is maintained during the entire time that the sleeve is being supplied to the valve. The clamping support is not released until the sleeve and valve are folded on top of each other during the final movements of the apparatus C. From this it will be noted that the apparatus C provides a rigid support for the valve during the application of a sleeve thereto and assists in the subsequent folding of the sleeve and valve in addition to opening the valve for the sleeve application operation.

Attention is also directed to the fact that the application of the sleeve is effected by the combined pivotal movements of the two apparatus C and F, and that these pivotal movements are in planes perpendicular to each other. It will be noted that opening and folding operations of the mechanism C involves pivotal movements of the parts 63 and 64 about the pivots 61 and 62 which have their axes in horizontal planes. On the other hand, the sleeve cutting and applying apparatus F is effected by a pivotal movement of the bracket support 92 which pivots about an axis lying in a vertical plane. These pivotal movements about axes in planes normal to each other are sequentially timed so that the bag is first opened, a sleeve applied to its valve, and then folded; the opening and folding of the bag being effected by apparatus pivoting about horizontal pivots, and the sleeve applying being effected by apparatus pivoting about a vertical pivot. Attention is particularly directed to the fact that the movement of the apparatus accomplishing these operations is entirely pivotal and that it is not necessary to shift the position of the axes about which these movements take place in any direction. In this manner, it will be seen that the necessity of providing sliding supports on which the apparatus may be shifted to and from operative operating positions is entirely eliminated.

Referring to Fig. 1, attention is particularly directed to the fact that the pivotal axes of the gripping mechanisms 63 and 64, as designated by the pivot 61 in Fig. 1, are positioned in substantial alignment with the extreme edge supporting slats of the rack conveyor A. These supporting slats at the extreme right edge of the conveyor as viewed in Fig. 1 consist of superimposed slats 2 and 12 which are respectively positioned below and above a bag in sleeve applying position. Because of this arrangement, it will be apparent that the opposite bag faces *f* and *g*, at least the portions thereof to the left of the right-hand edge slats 2 and 12 as viewed in Fig. 1, will be restrained against movement away from each other when the gripping mechanisms 63 and 64 are operated to unfold a valve. The unfolding movement of the bag faces *f* and *g* in response to operation of the gripping mechanisms 63 and 64 will thus be confined to a pivotal movement of those portions of the bag faces *f* and *g* to the right of the slats 2 and 12 at the extreme right edge of the conveyor A and adjacent its open end *o*. The opening movement of the bag faces *f* and *g* will thus be a pivotal movement of the end portions at its open end about an axis extending transversely of the bag and spaced inwardly from its open end which coincides with the slats 2 and 12 and the axes of the pivot pins 61 and 62. The restraint against opening movement applied by the edge slats 2 and 12 improves the action of the gripping mechanisms 63 and 64 in that it assists in holding the bag against movement in the application of a sleeve to its valve.

While the apparatus described above and shown in the drawings constitutes a preferred embodiment of the invention, it is to be understood that this is by way of illustration only, and that various changes and modifications may be made therein within the contemplation of this invention and under the scope of the following claims. Therefore, without limitations in this respect, the invention is defined by the following claims:

I claim:

1. Apparatus for applying sleeves to the valve portions of paper bags comprising a conveyor on which the bags are received for movement thereby in a direction transversely of their longitudinal axes from a receiving station to a discharging station, means operating the conveyor to move each bag to a sleeve applying position, separate gripping means respectively positioned at opposite sides of the bag when in said position for gripping engagement with opposite faces of the bag at points adjacent its open end and spaced inwardly of the valve portion thereof and for moving said faces apart from each other to unfold the valve portion, sleeve applying means comprising a frame mounted for pivotal movement and having a sleeve supporting plate onto which a sleeve may be fed and supported in a position at one side of valve portion, and means for pivoting said frame when a bag valve portion is unfolded to bodily move the sleeve supported thereby from a sleeve receiving position to a position superimposed against the unfolded valve portion for attachment thereto.

2. Apparatus for applying sleeves to the previously formed valves of paper bags comprising a conveyor on which the bags may be placed in a horizontal position for rectilinear movement thereby in a direction transversely of their longitudinal axes from a receiving station to a discharging station, means intermittently operating the conveyor to stop each bag at an intermediate station in a sleeve applying position with its open end adjacent an edge of the conveyor, a pair of supports extending transversely of said conveyor and respectively positioned above and below a bag in sleeve applying position, each of said supports having gripping mechanism at an end thereof adjacent the open end of the bag for gripping engagement with the adjacent face of the bag at a point spaced inwardly of its valve, means for operating said gripping mechanism to move the opposite faces of the bag apart from each other to unfold the valve, and means for applying a sleeve to the unfolded valve.

3. Apparatus for applying sleeves to the valve portion of paper bags comprising a conveyor, a frame mounted adjacent one edge of the conveyor for pivotal movement, said frame having means for receiving and supporting a sleeve thereon, said conveyor including means for moving a bag transversely of its longitudinal axis to a sleeve applying position with its open end adjacent said frame, gripping means engageable with the edges of opposite faces of the bag at points adjacent its open end and inwardly of its valve portion when it is in a sleeve applying position, means for operating said gripping means to move the opposite faces of a bag engaged thereby apart to unfold the valve portion, and means for pivoting said frame to move a sleeve supported thereby to a position superimposed against the unfolded valve portion.

4. Apparatus for applying sleeves to the previously formed valves of paper bags comprising a frame for receiving and supporting a sleeve in vertical position thereon, a conveyor on which the bags are placed in a horizontal position for movement from a receiving station to a discharging station, means mounting said frame for pivotal movement about a vertical axis adjacent an edge of said conveyor from a sleeve receiving position to a sleeve applying position, an intermittent drive for said conveyor operable to stop movement of the bags in a sleeve applying position, means engageable with the edges of opposite faces of the bag when moved to its sleeve applying position for spreading said faces to unfold the valve, and operating means for thereafter pivoting said frame to its sleeve applying position with the sleeve supported thereby superimposed against the unfolded valve.

5. Apparatus as claimed in claim 4 characterized by the provision of means for clamping the superimposed sleeve and valve against said frame.

6. Apparatus as claimed in claim 3 characterized by the provision of a reel and feed-rolls for feeding a strip of sleeve-paper onto said frame when it is in its sleeve receiving position, and in which said frame is provided with a cutter bar for severing the sleeve from said strip upon pivotal movement of the frame to its sleeve applying position.

7. Apparatus as claimed in claim 3 characterized by the provision of folding means at the outer edge of said frame for folding the inner edge of the sleeve about the end of the value portion on which it is superimposed, and an actuating means for operating said folding means in response to pivoting movement of the frame.

8. Apparatus as claimed in claim 3 characterized by the provision of means for applying a strip of adhesive to edge of the sleeve.

9. Apparatus as claimed in claim 8 characterized by the provision of folding means at the outer vertical edge of said frame for folding the adhesive bearing edge of the strip about the inner vertical edge of the valve to adhere the sleeve to the valve.

10. In sleeve applying apparatus for paper bag machines, a frame mounted for pivotal movement, a stationary cutter bar extending along one edge of said frame adjacent its pivotal axis, the edges of said frame having guide grooves in which opposite edges of a sleeve blank are receivable, and clamping means movable through one side of said grooves for clamping the said sleeve blank edges against the other side of said grooves.

11. In sleeve applying apparatus for paper bag machines, a frame mounted for pivotal movement about a vertical axis a stationary cutter bar extending along one vertical edge of said frame adjacent said axis, the upper and lower edges of said frame having guide grooves in which opposite edges of a sleeve blank are receivable, clamping means movable through one side of said grooves for clamping the said sleeve blank edges against the other side of said grooves, and a folding plate pivoted to the outer vertical edge of said frame for folding the outer vertical edge of a sleeve blank on said frame back on itself to provide a valve attaching lip at the said outer edge of the blank.

12. In sleeve applying apparatus for paper bag machines, a frame mounted for pivotal movement, a stationary cutter bar extending along one edge of said frame adjacent its pivotal axis, the opposite edges of said frame having guide grooves in which opposite edges of a sleeve blank are receivable, and a folding plate pivoted to the outer edge of said frame for folding the outer edge of a sleeve blank on said frame back on itself to provide a valve attaching lip at the said outer edge of the blank.

13. In sleeve applying apparatus for paper bag machines, a frame mounted for pivotal movement, the opposite edges of said frame having guide grooves in which opposite edges of a sleeve blank are receivable, said frame having a supporting surface between said guide grooves, and a clamping finger mounted at the outer edge of said frame for pivotal movement to a clamping position in which the end of said finger clamps said sleeve blank against said supporting surface.

14. In sleeve applying apparatus for paper bag machines, a frame mounted for pivotal movement, the opposite edges of said frame having guide grooves in which opposite edges of a sleeve blank are receivable, said frame having supporting surfaces between said guide grooves, clamping fingers mounted at the outer edge of said frame for pivotal movement to a clamping position in which the ends of said fingers clamp said sleeve blank against said supporting surfaces, and actuating means for pivoting said fingers to and from clamping position in response to pivotal movement of said frame.

15. In sleeve applying apparatus for paper bag machines, a frame mounted for pivotal movement, the opposite edges of said frame having guide grooves in which opposite edges of a sleeve blank are receivable, a folding plate mounted for pivotal movement at the outer edge of said frame for folding the outer end of a sleeve positioned in said grooves on itself to provide a lip, said frame having a supporting surface between said guide grooves, a clamping finger at the outer edge of said frame and mounted for pivotal movement to a clamping position in which the end of said finger clamps said sleeve blank against said supporting surface, and actuating means for pivoting said clamping finger and folding plate in response to pivotal movement of said frame.

16. In apparatus for applying sleeves to the valve portions of paper bags, a sleeve applying frame movable to a position in which a sleeve supported thereby is superimposed against the unfolded valve portion of a paper bag, means on said frame for receiving a sleeve blank, means for feeding a blank to said receiving means including means for applying a strip of adhesive to a transverse outer edge of the blank, means for creasing the blank along a transverse line normal to the sides of said blank and spaced inwardly from said strip, and a folding plate pivoted to the outer edge of said frame for pivotal movement upon movement of the sleeve on the frame to its superimposed position to fold the adhesive bearing edge of said blank about said transverse line into adhering engagement with the inner surface of the valve portion.

17. In apparatus for applying sleeves to the previously formed valves of paper bags, a sleeve applying frame movable to a position in which a sleeve supported thereby is superimposed against the unfolded valve of a paper bag, means on said frame for receiving a sleeve blank, means for feeding a blank to said receiving means including means for applying a strip of adhesive to a transverse outer edge of the blank, means for creasing the blank along a transverse line parallel to said outer edge and spaced inwardly from said strip, a folding plate pivoted to the outer edge of said frame for pivotal movement to fold the adhesive bearing edge of said blank about said transverse line into adhering engagement with the inner surface of the valve, and means responsive to movement of the frame to its said sleeve superimposing position for actuating said folding plate.

18. A sleeve applying apparatus for valved paper bags comprising means for holding engagement with the edge of a bag adjacent its open end at a point spaced inwardly of the valve portion thereof, pivot means mounting said holding means for pivotal movement about an axis extending transversely of the bag to spread the faces of the bag engaged thereby and unfold the valve portion, a movable frame for receiving and supporting a sleeve thereon, and pivot means mounting said frame for pivotal movement about an axis normal to the plane of the bag to move a sleeve supported thereon to a position superimposed against the unfolded valve portion.

19. A sleeve applying apparatus for valved paper bags comprising means for holding engagement with the edge of a bag adjacent its open end at a point spaced inwardly of the valve portion thereof, pivot means mounting said holding means for pivotal movement about an axis extending transversely of the bag to spread the faces of the bag engaged thereby and unfold the valve portion, a movable frame for receiving and supporting a sleeve thereon, pivot means mounting said frame for pivotal movement about an axis normal to the plane of the bag to move a sleeve supported thereon to a position superimposed against the unfolded valve portion, and actuating means for said holding means and frame including a control mechanism for moving said holding means about said first pivot means and for operating said frame about said second pivot means.

20. A sleeve applying apparatus for valved paper bags comprising a conveyor for moving the bags sidewise in a horizontal plane from a receiving station to a discharging station, actuating means for operating said conveyor to move each bag to a sleeve applying position with its open and valve end adjacent an edge of the conveyor, means for holding a bag in engagement with an edge of the conveyor, means for holding engagement with an edge of the bag adjacent its open end and at a point spaced inwardly of its valve portion and a side edge of the bag, pivot means mounting said holding means for pivotal movement about an axis extending transversely of the bag to thereby spread the bag faces and unfold the valve portion, a movable frame for receiving and supporting a sleeve thereon, and pivot means mounting said frame for pivotal movement about an axis normal to the plane of the bag to move a sleeve supported thereon to a position superimposed against the unfolded valve.

21. A sleeve applying apparatus for valved paper bags comprising a conveyor for moving the bags from a receiving station to a discharging station, actuating means for operating said conveyor to move each bag to a sleeve applying position with its open and valve end adjacent an edge of the conveyor, means for holding engagement with an edge of the bag adjacent its open end and at a point spaced inwardly of its valve portion and a side edge of the bag, pivot means mounting said holding means for pivotal movement about an axis extending transversely of the bag to thereby spread the bag faces and unfold the valve portion, a movable frame for receiving and supporting a sleeve thereon, pivot means mounting said frame for pivotal movement about an axis normal to the plane of the bag to move a sleeve supported thereon to a position superimposed against the unfolded valve portion, and actuating means operable in timed relation to the conveyor for operating said holding means about said first pivot means and said frame about said second pivot means.

22. In sleeve applying apparatus for paper bags, a platform for receiving a bag thereon with its open end adjacent one edge thereof, a pivot support adjacent the open end of the bag and providing a pivot axis parallel to said open end, bag gripping mechanism mounted on said pivot support including a suction plate for engagement with a face of the bag and a clamping finger for clamping engagement with an edge of the bag face defining its open end, actuating means for pivoting said gripping mechanism about its support to effect a separation of the bag face through said plate and finger, said plate being operative to effect an initial separation of the bag faces, and a control mechanism for actuating said finger into clamping engagement with the bag end edge subsequent to said initial separation.

23. Apparatus as claimed in claim 22 characterized by said clamping finger and suction plate being independently mounted on said pivot support and said suction plate having an operative connection with said finger whereby said actuating means effects pivotal movement of said finger about said pivot support through said suction plate.

24. In sleeve applying apparatus of the character described, a support having a reel of sleeve paper and a stationary cutter bar thereon, a frame pivoted on said support for pivotal movement about an axis from a sleeve receiving position to a sleeve applying position, means on said frame for receiving and supporting the end portion of said sleeve paper, feeding means operable when said frame is in its receiving position to feed the end portion of sleeve paper from said reel onto said frame, and a cutter bar on said frame operatively arranged relative to said stationary bar to sever said end portion from said reel upon pivotal movement of said frame from its receiving position to its sleeve applying position.

25. In apparatus for applying sleeves to the previously formed valves of paper bags a conveyor for supporting the bags in a horizontal position with their open and valved ends adjacent one edge thereof and for conveying the bags rectilinearly from a receiving station to a discharging station, actuating means for operating said conveyor intermittently and for stopping each bag conveyed thereby in an intermediate sleeve applying station, valve unfolding means comprising a pair of gripping devices at said intermediate station and respectively positioned above and below the conveyor and adjacent its said one edge for gripping engagement with opposite faces of the bag at points adjacent its open end and inwardly of the bag valve and one side edge thereof, and means for moving said gripping devices apart from each other to unfold the valve into a vertical plane, and means at said intermediate station for applying a sleeve to the unfolded valve comprising a frame mounted for pivotal movement about an axis perpendicular to the plane of the bag and arranged adjacent said one conveyor edge, said frame including a vertical support onto which a sleeve may be fed and supported in a vertical position, and means operative after operation of said gripping devices to unfold the bag valve for pivoting said frame to move the vertical support and sleeve supported thereby to a position with the sleeve superimposed against the unfolded valve for attachment thereto.

26. The invention defined in claim 25 characterized by said gripping devices respectively having supporting members extending transversely of said conveyor, and mounting means for said supporting members positioned at the other edge of said conveyor, said mounting means including means for operating said means for moving said gripping devices apart.

27. The invention defined in claim 25 characterized by said gripping devices each including suction means engaged with opposite faces of the bag during initial separating movement of said devices apart from each other for effecting a partial separation of the bag faces, and clamping fingers movable into clamping engagement with the partially separated bag faces at said points for effecting final separation of the bag faces during the final movement of said separating devices apart from each other to complete the unfolding of the valve.

28. In apparatus for applying sleeves to the previously formed valves of paper bags, a conveyor for supporting the bags in a horizontal position with their open and valved ends adjacent one edge thereof and for conveying the bags rectilinearly from a receiving station to a discharging station, actuating means for operating said conveyor intermittently and for stopping each bag conveyed thereby in an intermediate sleeve applying station, valve unfolding means comprising a pair of gripping devices at said intermediate station and respectively positioned above and below the conveyor and adjacent its said one edge for gripping engagement with opposite faces of the bag at points adjacent its open end and inwardly of the bag valve and one side edge thereof, and means for moving said gripping devices apart from each other to unfold the valve into a vertical plane, and means at said intermediate station for applying a sleeve to the unfolded valve comprising a support having a reel of sleeve paper and a stationary vertical cutter bar thereon, a frame pivotal on said support for movement about a vertical axis adjacent said one conveyor edge, means for feeding a sleeve blank from said reel onto said frame, a vertical cutter bar mounted on said frame in an operative position relative to said stationary bar for severing said blank upon pivotal movement of the frame, and means for pivoting said frame to move the blank thereon to a position superimposed against the unfolded valve.

29. In sleeve applying apparatus for paper bags, a platform for receiving a bag thereon in a horizontal plane with its open end adjacent one edge thereof, a pair of supports extending lengthwise of and respectively positioned above and below said platform, each of said supports having one end provided with a mounting connection at an opposite edge of the platform and gripping mechanism at its other end for gripping engagement with an adjacent face of the bag at a point spaced inwardly from one of its side edges, each of said gripping mechanisms including a pivot connection with its support for pivotal movement about an axis extending transversely of the bag and positioned adjacent the bag faces inwardly from the open end of the bag to thereby limit the face spreading to the end portions of the bag between said axis and said open end, and means for moving said gripping mechanisms apart from each to spread apart the bag faces engaged thereby.

30. In sleeve applying apparatus for paper bags, a platform for receiving a bag thereon in a horizontal plane with its open end adjacent one edge thereof, a pair of supports extending lengthwise of and respectively positioned above and below said platform, each of said supports having one end provided with a mounting connection at an opposite edge of the platform and gripping mechanism at its other end for gripping engagement with an adjacent face of the bag at a point spaced inwardly from one of its side edges, each of said gripping mechanisms having a pivot connection with its support about an axis extending transversely of the bag and including a gripping finger and an arm for gripping the bag edge therebetween, each of said fingers having a pivot connecting it to one of said arms for pivotal movement about an axis parallel to said transverse axis and which substantially coincides with the edge of the open bag end, and means for moving said gripping mechanism apart from each to spread apart the bag faces engaged thereby.

31. In sleeve applying apparatus for paper bags, a platform for receiving a bag thereon in a horizontal plane with its open end adjacent one edge thereof, a pair of supports extending lengthwise of and respectively positioned above and below said platform, each of said supports comprising a hollow tube having one end provided with a mounting connected at an opposite edge of the platform and gripping mechanism at its other end for gripping engagement with an adjacent face of the bag at a point spaced inwardly from one of its side edges, and means including a rod movable axially through each of said tubes for moving said gripping mechanisms apart from each other to spread apart the bag faces engaged thereby.

32. In sleeve applying apparatus for paper bags, a platform for receiving a bag thereon, in a horizontal plane with its open end adjacent one edge thereof, a pair of supports extending lengthwise of and respectively positioned above and below said platform, each of said supports having one end provided with a mounting connection at an opposite edge of the platform and a gripping mechanism pivotally connected with its other end for gripping engagement with an adjacent face of the bag at a point spaced inwardly from one of its side edges, each of said gripping mechanisms including a suction plate initially engageable with one of said bag faces for effecting initial separation thereof and a clamping finger for positive clamping engagement with the end edge of the bag after initial separation of its faces, and means for moving said gripping mechanisms apart from each other to spread apart the bag faces engaged thereby.

References Cited in the file of this patent

UNITED STATES PATENTS

| | | |
|---|---|---|
| 1,127,006 | Hullings | Feb. 2, 1915 |
| 1,282,314 | Swift | Oct. 22, 1918 |
| 2,387,274 | Lee | Oct. 23, 1945 |
| 2,527,295 | Belcher et al. | Oct. 24, 1950 |
| 2,559,873 | Grupe et al. | July 10, 1951 |
| 2,584,529 | Allen | Feb. 5, 1952 |
| 2,643,588 | Burroughs | June 30, 1953 |